United States Patent Office 3,562,750
Patented Feb. 9, 1971

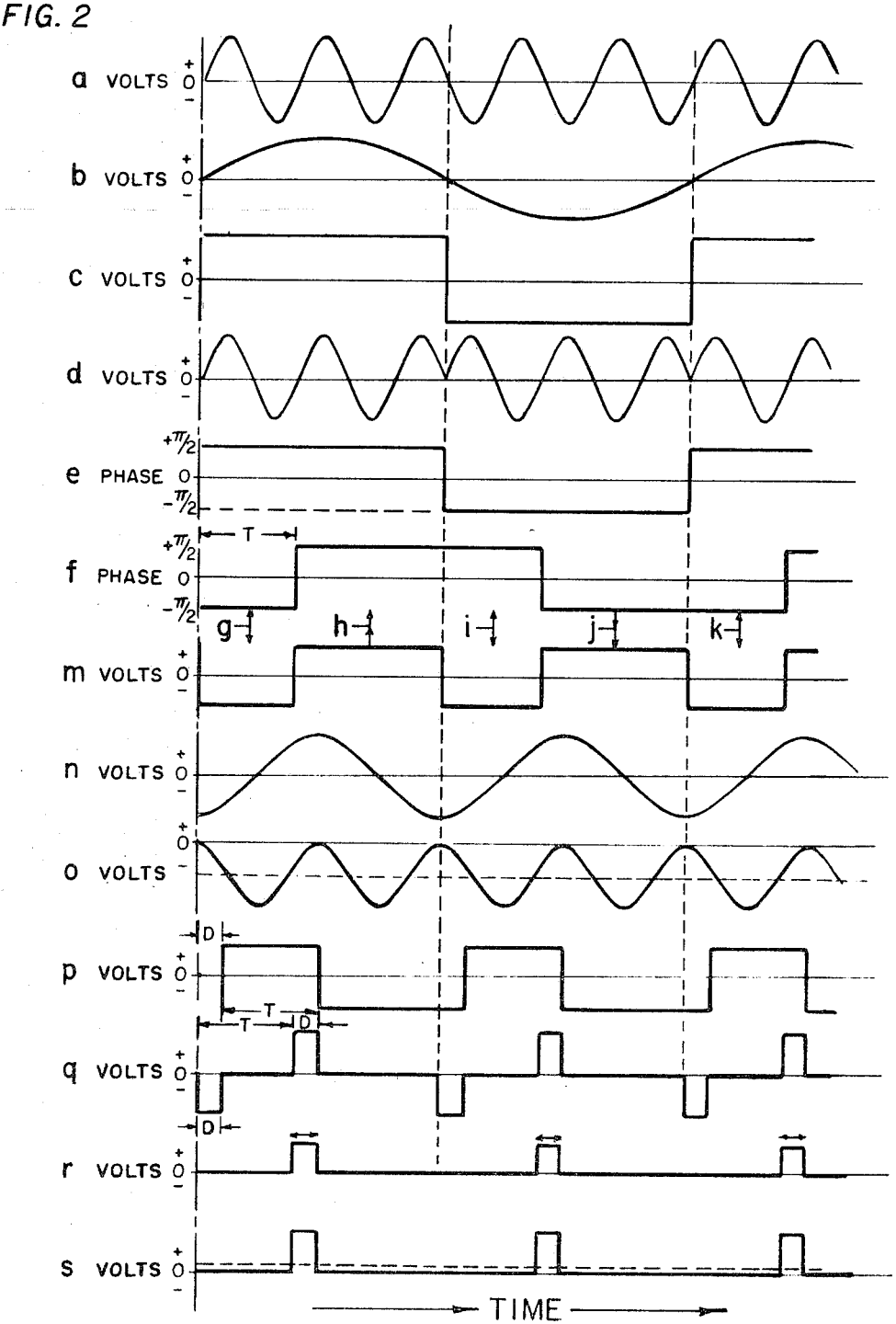

3,562,750
CONTINUOUS WAVE CORRELATION RADAR
William Fishbein, Elberon, and Otto E. Rittenbach,
Neptune, N.J., assignors to the United States of America as represented by the Secretary of the Army
Filed June 15, 1966, Ser. No. 563,623
Int. Cl. G01s 9/42
U.S. Cl. 343—7.7        8 Claims

ABSTRACT OF THE DISCLOSURE

The continuous wave carrier of this radar is periodically phase modulated. Target echoes are heterodyned with a sample of the phase-modulated transmitted wave and then applied in parallel to an all-range channel and a ranging channel. The all-range channel responds to targets at all ranges and the ranging channel can be used to determine the range of a particular target. The Doppler modulation of a range-gated target in the ranging channel is correlated with the Doppler modulation of the same target in the all-range channel and the setting of the range gate will then indicate the target range. The Doppler signals in both channels can be aurally monitored.

---

The invention described herein may be manufactured and used by or for the Government for governmental purposes without the payment to us of any royalty thereon.

The present invention relates to continuous wave (cw) radar intended for use in combat surveillance and more particularly to such radar in which the transmitted carrier wave is phase modulated to permit determination of target range. Target echoes are heterodyned with the transmitted wave and applied to an "all-range" channel and to a "ranging channel." The all-range channel responds to targets at any range and the ranging channel determines the range of any particular target. The sinusoidal signal in the all-range channel is demodulated by comparing its phase with that of the output of an intermediate frequency generator, which also controls the modulation of the transmitter. In the ranging channel a variable range gate pulse derived from the same intermediate frequency generator selects targets within a given range interval or gate. The Doppler modulation on these selected target echoes is correlated with the same Doppler modulation appearing in the all-range channel. The correlation will reach a maximum when the range gate pulse is set at a value equal to the range of the selected moving target.

The presently disclosed radar set is an improvement on a similar type of combat surveillance radar set disclosed in the co-pending application, Ser. No. 217,243, of William Fishbein entitled "Combined Pulse and Continuous Wave Radar." In that radar set, the microwave carrier is simultaneously modulated by two diverse modulation signals, whereas in the presently disclosed radar, only one modulation signal is necessary. This makes the circuitry easier to instrument and eliminates problems of adjustment and interference between the two modulation signals. Also, the substantially square wave modulation of the present radar results in enhanced echo power in the all-range channel compared to the sinusoidally modulated signal of the prior art.

It is therefore an object of the invention to provide a low power angle modulated continuous wave radar set adapted for combat surveillance applications.

Another object of the invention is to provide a small, lightweight radar set having low power requirements and capable of simultaneously monitoring targets at all ranges and of determining the range of any given moving target by correlation of the Doppler target signals in different channels.

These and other objects and advantages of the invention will become apparent from the following detailed description and drawings, in which:

FIG. 2 is a series of waveforms illustrating the operations of the radar set of FIG. 1, the reference letters therein showing the waveforms on the similarly lettered leads of FIG. 1.

Figure 1:
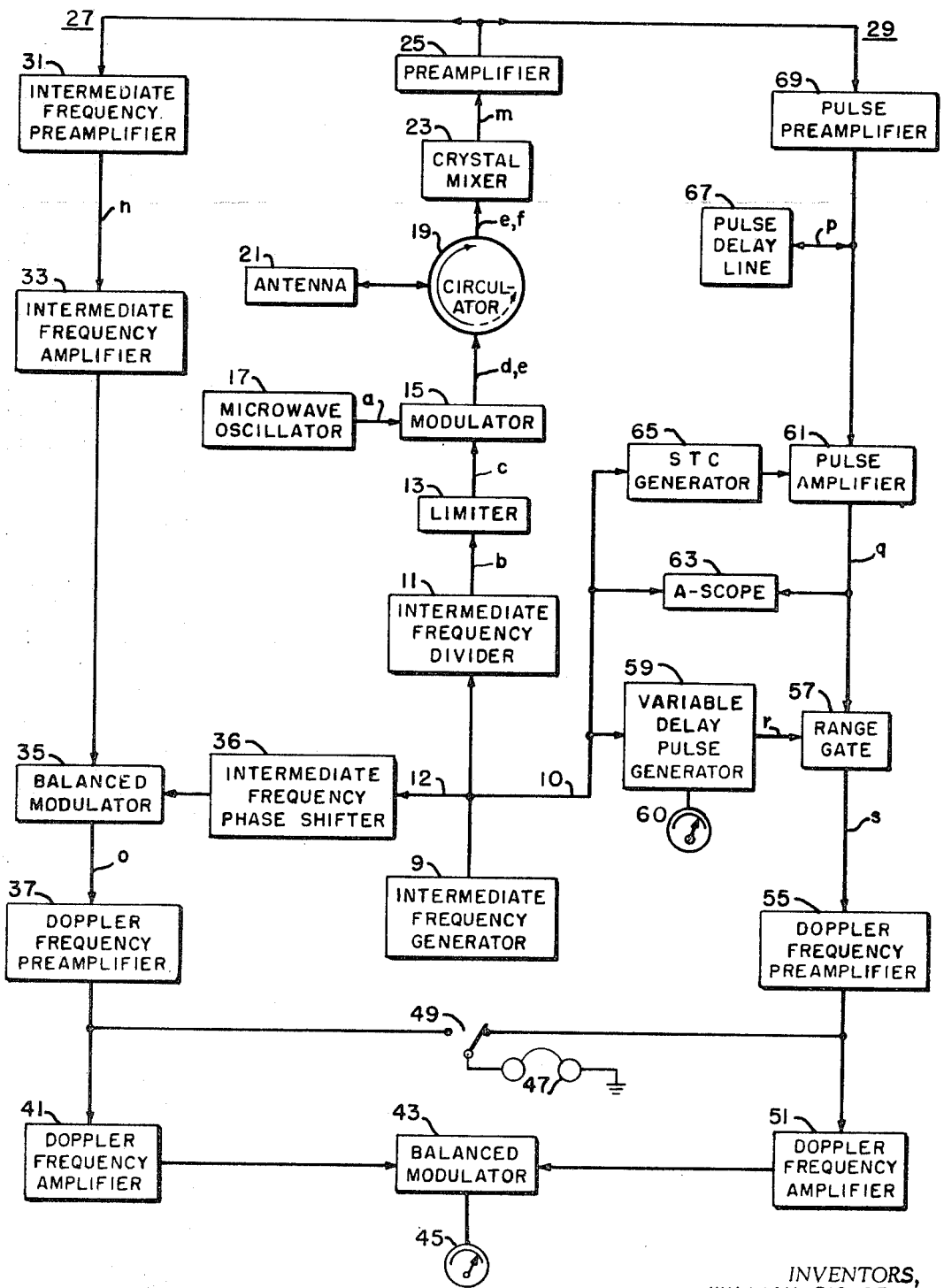
FIG. 1 is a block diagram of one embodiment of the present invention.

Referring first to FIG. 1, the radar set shown therein comprises a microwave oscillator 17 which generates a continuous carrier wave in the microwave region. The output of this oscillator, shown at FIG. 2a, is applied to modulator 15. The intermediate frequency generator 9 is a sinusoidal oscillator with a frequency double that of the desired square wave phase modulation to be applied to the microwave oscillator 17. The frequency of generator 9 is divided by a factor of two in intermediate frequency divider 11, the output of which is shown at FIG. 2b. The output of divider 11 is converted into a square wave of the same frequency in limiter 13, the output of which is shown in FIG. 2c. The output of limiter 13 comprises the modulating signal for modulator 15, which may take the form of a simple balanced modulator with the output of the microwave oscillator 17 applied in push-pull to the two diodes or other nonlinear elements thereof and the output of limiter 13 applied in parallel thereto. With this circuitry the phase of the output of modulator 15 is changed by 180° at each zero crossing of the square wave output of limiter 13. The square wave-phase modulated carrier is shown in FIG. 2d. This signal is applied to circulator 19 which functions as a duplexer for applying the transmitted signal to the antenna 21 and the received echoes to the receiving channels. The direction of easy energy flow around the circulator 19 is shown by the solid-lined arrow. The transmitted signal from modulator 15 therefore travels clockwise around the circulator to antenna 21. Target echoes are simultaneously received at the antenna and travel clockwise around the circulator to the receiver crystal mixer 23. A small amount of the transmitted signal leaks around the circulator in the counter-clockwise direction and is applied to the mixer 23 to form a local oscillator signal for demodulating the received signals. This leakage path is shown by the dashed line arrow within circulator 19. The mixer 23, which may comprise a single diode mounted in a waveguide, merely rectifies the algebraic or vector sum of the target echo signal and the local oscillator signal applied thereto. FIG. 2e shows the phase of the local oscillator signal, which is the same as the phase of the transmitted signal. FIG. 2e shows the phase of the local oscillator signal, which is at a range such that the round trip transit time thereto is T seconds. The waveform 2f is therefore the same shape as 2e, but is shifted along the time axis by T seconds. The waveform 2m is the alternating component of the mixer output. FIGS. 2g–k are vector diagrams which illustrate how this mixer output results from its inputs. During the interval g the local oscillator signal, 2e, is of positive phase and the target signal, 2f, of negative phase, therefore the rectified algebraic sum of these two out of phase vectors will be a minimum, resulting in a negative alternating voltage component mixer output during this interval. During the next interval h, both mixer inputs are of positive phase and therefore the two vectors add linearly to produce a positive mixer voltage output. Similarly, during the next interval, i, the negative phased local oscillator signal and the positively phased target signal combine to form a negative mixer output. During the next interval, $j$, both mixer inputs are of negative phase and the absolute value of this vector sum thereof will be a maximum, resulting in a positive mixer output. It should be noted that the fundamental frequency of the waveform $2m$ is double that of the modulating waveform, FIG. $2c$, of the transmitted signal. The reason for this is that the diode mixer responds only to the amplitude of the vector sum of the two signals applied thereto and is insensitive to the phase of this vector sum, therefore the two positive phased vectors of $2h$ and the two negative phased vectors of $2j$ both produce positive mixer outputs.

After amplification in preamplifier 25 the signal of FIG. $2m$ is applied in parallel to all-range channel 27 and ranging channel 29. In channel 27 the signal is applied first to intermediate frequency preamplifier 31, which filters the fundamental sinusoidal component from the complex waveform of FIG. $2m$ to yield the sine wave of FIG. $2n$. It should be noted that this sine wave $2n$ is of the same frequency as that of the intermediate frequency generator 9, due to the frequency doubling effect of the mixer, as explained above. Thus the intermediate frequency generator 9 can be utilized as a coherent oscillator for extracting the Doppler information from the signals in the all-range channel. To this end, the all-range target signals are further amplified by intermediate frequency amplifier 33 and then applied to balanced modulator 35, the other input of which is the output of intermediate frequency generator 9 after it has been phase shifted in phase shifter 36. Balanced modulator 35 functions as a phase detector or multiplier and produces an output with a DC component proportional to the phase difference between its two inputs. The phase shift of shifter 36 is set at such a value that the balanced modulator 35 operates in a sensitive region of its characteristic for targets at approximately half the maximum range. The balanced modulator 35 will then be operating at reduced sensitivity for closer in targets thereby compensating for the increased target echo power at short ranges. This provides a sort of sensitivity time control (STC) for the all-range channel. Also, this adjustment of the phase shifter 36 will reduce the sensitivity for targets between half maximum range and maximum range. This arrangement permits small targets, such as enemy troops, to be efficiently detected out to half the maximum range while also detecting larger targets such as vehicles at longer ranges. FIG. $2o$ illustrates the output of the balanced modulator for a fixed target. This output consists of a sinusoidal double-frequency component and a negative DC component indicated by the dashed line. Movement of the target along the beam radius will cause Doppler frequency and phase shifts of the target signal relative to the transmitted signal and will therefore cause the DC component of the balanced modulator output to fluctuate. These Doppler signals which may be in the range of 30 to 1000 c.p.s. for moving personnel and surface vehicles are separated from the other components of the balanced modulator output by means of Doppler frequency preamplifier 37, which comprises a bandpass filter tuned to the desired Doppler frequency range, as well as an amplifier. The output of preamplifier 37 is applied to Doppler frequency amplifier 41, and thence to one input of balanced modulator 43, the output of which is applied to indicator 45, which may comprise a simple DC voltmeter or other voltage measuring means. The other input of balanced modulator 43 is the Doppler signals from the ranging channel 29. The purpose of the balanced modulator 43 is to correlate the Doppler signals of a given target from the two channels to obtain the target range. The Doppler signals from each channel are also applied to earphones 47 via double-throw switch 49 by means of which either channel may be aurally monitored. This permits a convenient aural correlation of the two Doppler signals, however greater accuracy is obtained with the electronic correlation performed by the balanced modulator 43 and the indicator 45.

It should be noted that the intermediate frequency should be chosen such that the round trip transit time to a target a maximum range will be less than the period of the intermediate frequency, to avoid range ambiguities.

In the ranging channel 29 the higher frequency video components of the output of the mixer 23 are preserved to permit range measurements of any given fixed or moving target in the beam of the antenna. The pulse preamplifier 69 amplifies the output of preamplifier 25. The output of preamplifier 69 will therefore be an amplified replica of that of FIG. $2m$. The output of preamplifier 69 is applied to pulse amplifier 61 and also to the input of a pulse delay line 67. The opposite end of delay line 67 is shorted and the waveform $2m$ upon reflection from this shorted end will suffer a reversal of polarity. FIG. $2p$ shows the reflected and delayed waveform as it emerges from the delay line 67. It can be seen that this waveform is waveform $2m$ with reversed polarity and shifted by D seconds along the time axis, D being the round trip transit time of the delay line. Due to the fact that the preamplifier 69 and the delay line 67 have appreciable and approximately equal internal impedance the outputs thereof will be algebraically added at the input amplifier 61 to produce the waveform of FIG. $2q$. This waveform comprises alternate positive and negative pulses of length D with the spacing from the leading edge of the negative pulse to the leading edge of the positive pulse equal to T, the target range. Thus the CW signal has been converted into a pulse type radar video signal with the pulses of one polarity (positive) corresponding to target echoes which vary in time depending on the target range and the pulses of opposite polarity (negative) remaining fixed in time. The negative pulses of FIG. $2q$ represent the sum of all of the target echoes at all ranges. Since these pulses remain fixed in time they are somewhat analogous to the transmitter pulses of a pulse radar, however, in the absence of any target within the radar beam, these negative pulses will disappear. The round trip delay D of line 67 determines the width of the video pulses at the input and output of amplifier 61 and in practice D is chosen to obtain an optimum compromise between signal-to-noise ratio and range resolution, short pulses yielding poor signal-to-noise ratios but good range resolution and vice versa for long pulses. In practice a pulse length D of approximately .5 microsecond has been found satisfactory in this application. The sensitivity time control circuit 65 applies a ramp type gain control voltage to pulse amplifier 61 in known fashion to equalize the output of the amplifier 61 for input pulses of different amplitudes representing targets at different ranges. The operation of the STC circuit 65 is synchronized with the generator 9 by a signal fed thereto over line 10. The A-scope 63 presents a visual display of all targets both moving and fixed. The sweep circuit of the A-scope is also connected to line 10 for synchronizing purposes. While indicating radially moving targets, the A-scope yields little information as to instantaneous target velocities.

The variable delay pulse generator 59 and the range gate 57 comprise range gating circuitry for selecting targets at a given range and measuring the target range thereof. The input to delay pulse generator 59 is the line 10 which provides triggering pulses therefor. Generator 59 produces a range gating pulse once during each cycle of intermediate frequency generator 9. This can be accomplished by arranging the circuit so that each positive-going or each negative-going zero-crossing of the output of generator 9 on line 10 produces a pulse in generator 59 which is then delayed by a variable amount by means of delay control 60. FIG. $2r$ shows the output of the delay pulse generator, the double headed arrows indicating how the pulses can be varied along the time axis as the manual delay control 60 is varied. The width of these pulses is made equal to D. The output of generator 59 and the output of amplifier 61 form the two inputs of range gate 57. If the delay of generator 59 is made equal to the round trip transit time to any given target, the positive target echo pulses of FIG. 2q will coincide in time with the pulses produced by generator 59, and the output of the range gate will be a train of pulses of width D and with amplitudes the same as the positive pulses of FIG. 2q as shown in FIG. 2s. If the range-gating pulses of FIG. 2r are not exactly lined up with the positive target echo pulses of FIG. 2q, the range gate output will consist of a train of pulses of width less than D. For a stationary target, the range gate output will have a DC component indicated by the dashed line of FIG. 2s. Radial target movement will cause this DC component to fluctuate in the same manner that the output of the balanced modulator 35 of the all-range channel fluctuates. The resulting Doppler signals are filtered and amplified in Doppler frequency preamplifier 55, which is tuned to the same frequency band as its counterpart 37 in the all-range channel. The Doppler signals from the ranging channel are applied to the correlation circuitry, already described via Doppler frequency amplifier 51.

The operation of the circuitry is as follows: The earphones are normally connected to the all-range channel 27 by means of switch 49. This permits the operator to monitor or detect moving targets at all ranges within the antenna beam as it is scanned. When a target of interest is aurally detected, it is kept in the beam by continued monitoring of the all-range channel and by antenna scanning, if necessary. The delay control 60 is then adjusted by trial and error until the deflection of indicator 45 is a positive maximum indicating maximum correlation. If the range gating pulses happen to be alined in time with the negative pulses of FIG. 2q, the output voltage of balanced modulator 43 would reverse in polarity, yielding a negative maximum reading on the indicator 45. The earphones can then be switched back and forth between the two channels to confirm the fact that the same moving target signal appears in both channels. The delay setting of the variable delay pulse generator 59 as read from a scale associated with control 60 then yields the target range. An experienced operator can estimate the radial speed and the character of the target, for example, whether it is a man or vehicle by the sound of the aural signal in earphones 47. The correlation process performed by the balanced modulator 43 and indicator 45 is similar to a synchronous detector. The signal-to-noise ratio in the all-range channel is substantially higher than that in the ranging channel except for targets at very close range, therefore a relatively "clean" Doppler signal is obtained from the all-range channel and applied to the balanced modulator 43 as a reference or local oscillator signal for synchronously demodulating the Doppler signal from the ranging channel, which would otherwise be buried in noise.

While the invention has been described in connection with an illustrative embodiment, the inventive concepts disclosed herein are of general application, accordingly the invention should be limited only by the scope of the appended claims.

What is claimed is:

1. A continuous wave radar set comprising; an intermediate frequency sinusoidal generator, a two-to-one frequency divider connected to the output of said sinusoidal generator, a limiter connected to the output of said divider for converting the output thereof to a square wave, a microwave oscillator, modulator means having as inputs the output of said microwave oscillator and said limiter, whereby the phase of said modulator means is changed by 180° at each zero crossing of the output of said limiter, means to radiate into space the output of said modulator means and to receive echo signals from targets in said space, a diode mixer adapted to heterodyne said echo signals with a sample of the output of said modulator means, means to apply the output of said mixer in parallel to an all-range channel and to a ranging channel, said all-range channel comprising an amplifier tuned to the frequency of said sinusoidal generator, a first balanced modulator and a phase shifter, the output of said amplifier forming one input of said first balanced modulator, the other input of which is the output of said phase shifter, the input of which is the output of said sinusoidal generator, a first Doppler frequency amplifier connected to the output of said first balanced modulator, said Doppler frequency amplifier comprising a bandpass filter adapted to pass signals from moving targets, a second balanced modulator, the output of said first Doppler frequency amplifier forming one input of said second balanced modulator; said ranging channel comprising a pulse preamplifier connected to the output of said diode mixer, a pulse delay line and a pulse amplifier connected to the output of said pulse preamplifier, a range gate connected to the output of said pulse amplifier, a variable delay pulse generator also connected to said range gate and arranged to periodically open said range gate at the frequency of said sinusoidal generator, a second Doppler frequency amplifier connected to the output of said range gate, said second Doppler frequency amplifier including a bandpass filter adapted to pass signals from moving targets, the output of said second Doppler frequency amplifier forming the second input of said second balanced modulator, an indicator comprising a direct curent voltmeter connected to the output of said second balanced modulator, and a pair of earphones arranged to aurally monitor the Doppler frequency target signals in both of said channels.

2. The radar set of claim 1 further comprising an A scope connected to the output of said pulse amplifier and adapted to visually display both moving and stationary targets at all ranges.

3. The radar set of claim 1 wherein the period of said sinusoidal generator is greater than the round trip transit time to a target at the maximum range of said radar set.

4. The radar set of claim 1 wherein the phase shift of said phase shifter is set at such a value that said first balanced modulator operates at maximum sensitivity for targets at approximately one half of the maximum range of said radar set.

5. A continuous wave radar set comprising, means to radiate into space a microwave signal which is periodically phase modulated by a square wave modulating signal such that the phase of said microwave signal changes by 180° at each zero crossing of said modulating signal, a sinusoidal oscillator, said modulating signal being derived by dividing by two the output of said sinusoidal oscillator, means to receive and to heterodyne target echoes with a sample of said microwave signal, means to apply the heterodyned target signals in parallel to an all-range channel and to a ranging channel, said all-range channel comprising an amplifier tuned to the frequency of said sinusoidal oscillator, means to coherently detect the output of said amplifier by comparing its phase with the phase of a phase shifted version of the output of said sinusoidal oscillator, means to filter and amplify Doppler frequency components indicative of moving targets at all ranges in the output of said last-named means; said ranging channel comprising, means to convert said heterodyned target signals to a train of pulse type signals comprising a series of pulses of one polarity with an interleaved series of pulses of opposite polarity which vary in time relative to said pulses of one polarity depending on the range of the targets represented thereby, means to display said pulse type signals on an A scope, variable rangegating means for selecting said pulse type signals of opposite polarity from any desired range interval, means to filter and amplify Doppler frequency components indicative of moving targets within said interval, and means for correlating said Doppler frequency components from both of said channels.

6. The radar set of claim 5 wherein said means for correlating said Doppler frequency components components comprises a balanced modulator with a direct current voltmeter connected to the output thereof.

7. The radar set of claim 5 further including means to aurally monitor said Doppler frequency components from both of said channels.

8. The radar set of claim 5 wherein said means to convert said heterodyned target signals to a train of pulse type signals comprises a delay line having one end connected to the output of a pulse preamplifier and its other end shorted, said preamplifier and delay line having appreciable and approximately equal impedances.

References Cited

UNITED STATES PATENTS 3,079,599   2/1963   Caspers _____ 343—9UX

RODNEY D. BENNETT, JR., Primary Examiner

T. H. TUBBESING, Assistant Examiner

U.S. Cl. X.R.

343—9